(12) United States Patent
Dylla

(10) Patent No.: US 7,870,690 B2
(45) Date of Patent: Jan. 18, 2011

(54) MAGNETIC MOUSE TRAP

(76) Inventor: Daniel Peter Dylla, 15815 S. River Rd., Plainfield, IL (US) 60544

( * ) Notice: Subject to any disclaimer, the term of this patent is extended or adjusted under 35 U.S.C. 154(b) by 482 days.

(21) Appl. No.: 12/058,270

(22) Filed: Mar. 28, 2008

(65) Prior Publication Data

US 2009/0241409 A1    Oct. 1, 2009

(51) Int. Cl.
*A01M 23/36* (2006.01)
(52) U.S. Cl. .............................. 43/81; 43/83.5
(58) Field of Classification Search .............. 43/81, 43/83.5, 82, 81.5, 83, 78
See application file for complete search history.

(56) References Cited

U.S. PATENT DOCUMENTS

| | | | |
|---|---|---|---|
| 2,188,297 A * | 1/1940 | Graybill | 43/81 |
| 2,225,254 A * | 12/1940 | Bowen | 43/83.5 |
| 2,735,216 A | 2/1956 | Stebbins | |
| 3,204,366 A * | 9/1965 | Weimer | 43/83.5 |
| D275,511 S | 9/1984 | Nagel | |
| 4,468,883 A | 9/1984 | Williams | |
| 4,472,904 A | 9/1984 | Wasielewski | |
| 5,528,853 A | 6/1996 | Dufaux et al. | |
| 6,564,501 B1 | 5/2003 | Schislyonok | |
| 2005/0274056 A1* | 12/2005 | Peters | 43/58 |

* cited by examiner

*Primary Examiner*—Christopher P Ellis

(57) ABSTRACT

The present invention is directed to a magnetic mouse trap for catching mice including a magnet, a holding member, a trap bar, a spring bar, and a base to allow a person to trap mice without having the mice steal the bait before the trap is released. A person can attach the bait to the holding member using the magnet to prevent mice from stealing the bait without triggering the trap bar.

1 Claim, 2 Drawing Sheets

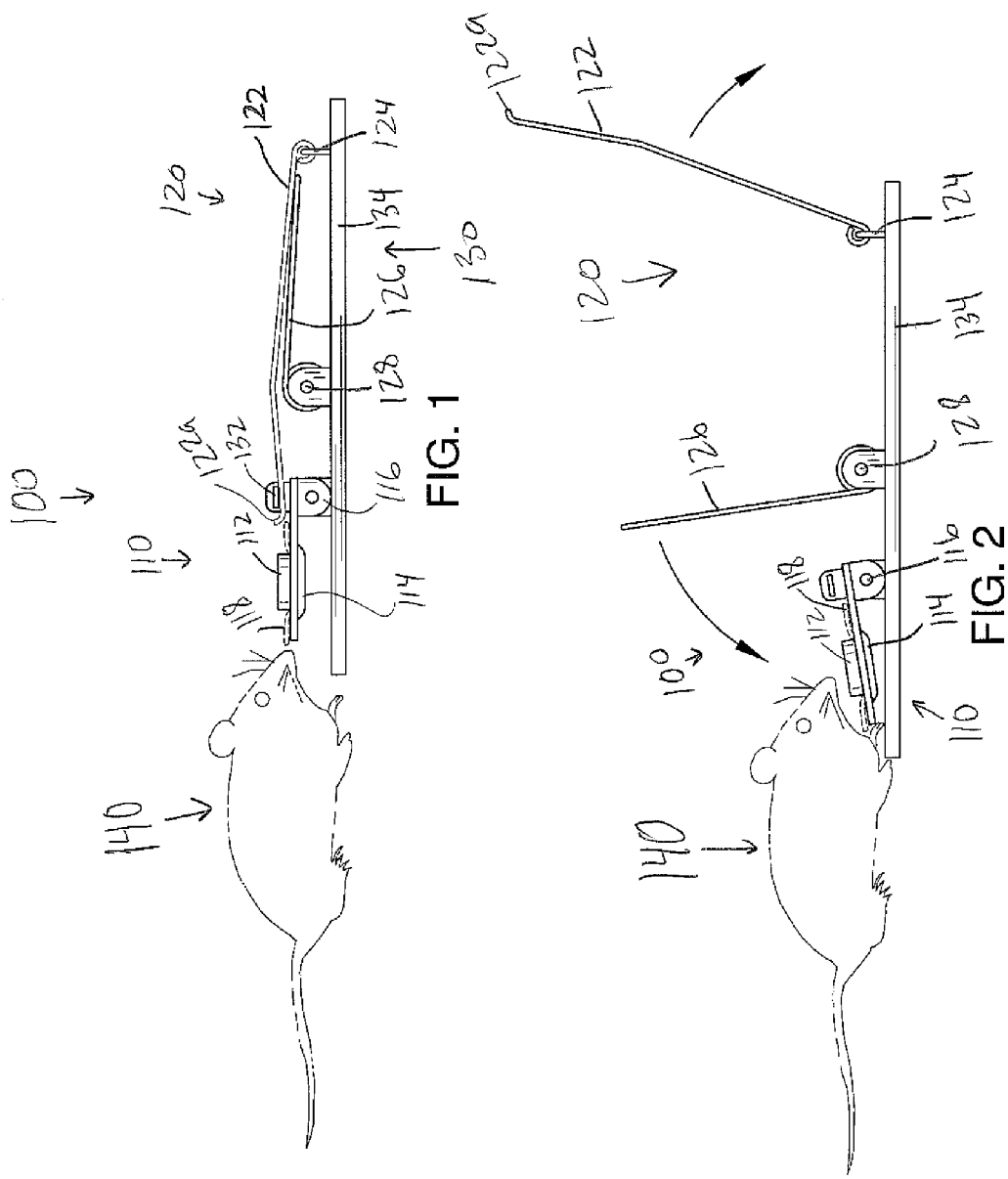

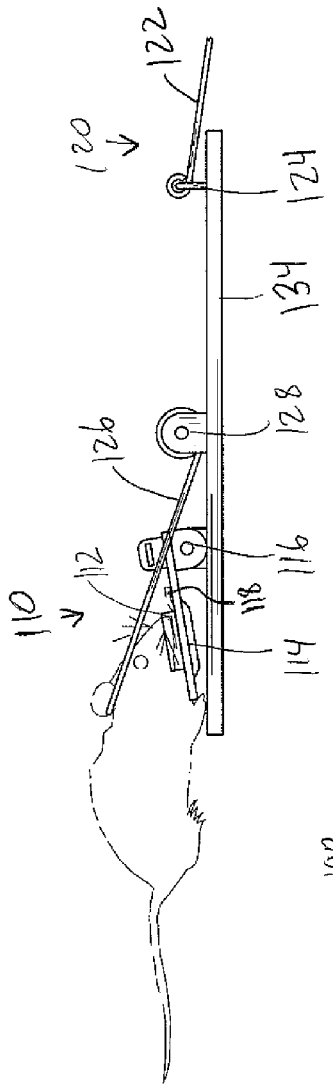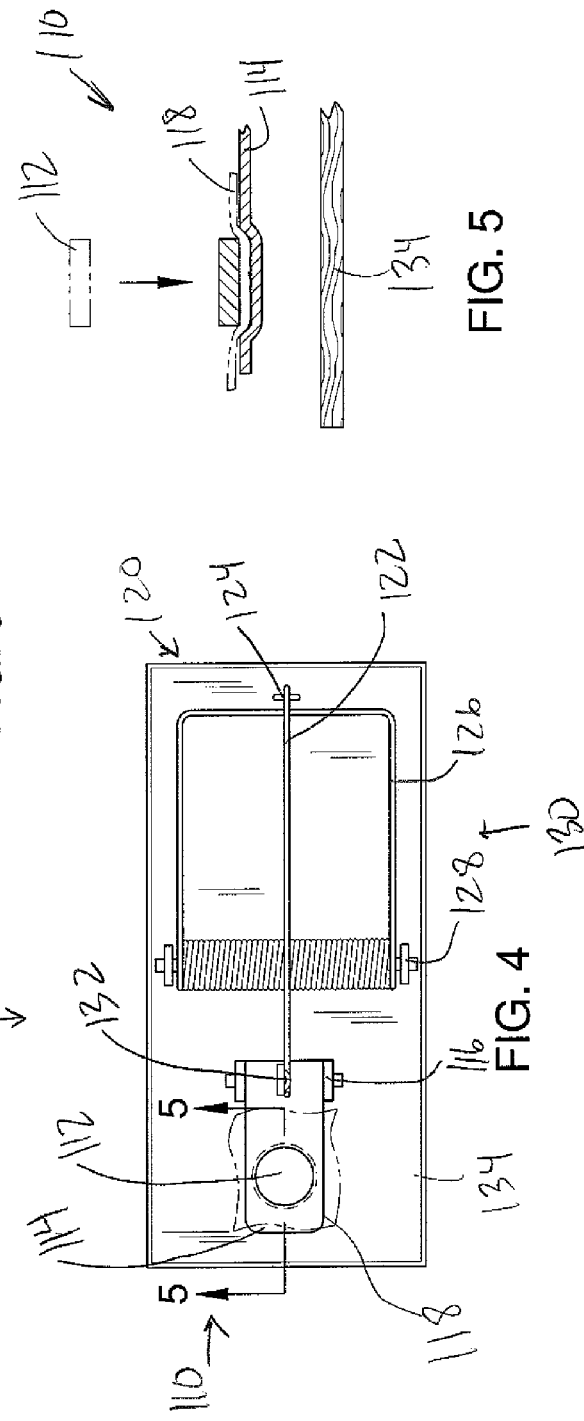
FIG. 3
FIG. 4
FIG. 5

MAGNETIC MOUSE TRAP

FIELD OF THE INVENTION

The present invention is directed to a magnetic mouse trap for catching mice including a magnet, a holding member, a trap bar, a spring bar, and a base to allow a person to trap mice without having the mice steal the bait before the trap is released.

BACKGROUND OF THE INVENTION

An object of this invention is to provide a magnetic mouse trap to catch mice that will effectively keep the mice from stealing the bait before the trap has been triggered. Another object of this invention is to provide an easy and convenient way to trap mice.

SUMMARY OF THE INVENTION

The present invention provides a magnetic mousetrap, comprising a magnetic holder comprising a metal holding member with a dimpled center, said dimpled center receives a bait, wherein said bait can be sandwiched between said metal holding member and a magnet, said bait is used to entice a mouse to come close to said magnetic mousetrap, said magnetic holder pivotably attached to a first hinge, said magnetic holder pivotally moves in a first direction around said first hinge and in a second and opposite direction around said first hinge, a spring bar comprising a first end and a second end, said first end of said spring bar releasably attached to said first hinge by an attachment member, said second end of said spring bar attached to a second hinge, said spring bar pivotably attached within said second hinge, said spring bar removeably hooked under said attachment member, said spring bar released from said attachment member when triggered by motion applied to said magnetic holder; and a trap bar held in a locked position by said spring bar, said trap bar comprising a third hinge, said third hinge applying tension to said trap bar when said trap bar is in said locked position, said trap bar released from said locked position when said spring bar is released from said locked position, said trap bar moves in an opposite direction to said tension in said trap bar, said trap bar snapping down on said mouse to trap said mouse.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is an illustration of a magnetic mousetrap according to the invention including a magnet, a holding member, a trap bar member, a spring bar, and a base.

FIG. 2 is an illustration of the magnetic mousetrap of FIG. 1 showing the motion of the trap bar member and the spring bar.

FIG. 3 is an illustration of the magnetic mousetrap of FIG. 1 showing the trap bar member trapping a mouse.

FIG. 4 is a top view of the magnetic mousetrap of FIG. 1.

FIG. 5 is cross section view of the magnet, holding member, and the base.

DESCRIPTION OF PREFERRED EMBODIMENTS

Referring now to FIG. 1, magnetic mousetrap 100 comprises magnetic holder 110, trapping apparatus 120, and base 130. In the illustrated embodiment of FIG. 1, magnetic holder 110 comprises magnet 112, holding member 114, hinge 116, and bait 118. In the illustrated embodiment of FIG. 1, trapping apparatus 120 comprises spring bar 122, first hinge 124, trap bar 126, and second hinge 128. In the illustrated embodiment of FIG. 1, base 130 comprises attachment member 132, and base member 134. In the illustrated embodiment of FIG. 1, a person can place bait 118 in holding member 114. In the illustrated embodiment of FIG. 1, the person sets magnetic mousetrap 100 by attaching spring bar 122 over the top of trap bar 126 and attaching loose end 122a to attachment member 132. To contain and hold bait 118 within holding member 114, a person can place magnet 112 over bait 118 keep bait 118 within holding member 114. When a mouse moves bait 118, the motion will trigger spring bar 122 to be released which will release trap bar 126 and the mouse will be trapped. Magnet 112 keeps a mouse from taking bait 118 away from the trap without triggering spring bar 122. When a person sets magnetic mousetrap 100, spring bar 122 is placed over trap bar 126. Second hinge 128 applies a tension to trap bar 126 when it is in a locked position. When magnetic holder 110 is moved by motion, spring bar 126 is release from under attachment member 132 and the tension of second hinge 128 is released and trap bar 126 snaps down to trap whatever object has caused movement of magnetic holder 110.

In certain embodiments, trapping apparatus 120 comprises a standard mousetrap device known to one skilled in the art. In certain embodiments, magnet 122 comprises a standard magnet known to one skilled in the art. In certain embodiments, holding member 114 comprises a rectangular shaped member comprising a dimpled center to allow magnet 112 to sit within the dimpled center. In certain embodiment, the dimpled center will comprise a substantially equal diameter as magnet 112. By "substantially equal," Applicant means the diameter of the dimpled center and the diameter of magnet 112 are equal +/−⅛$^{th}$ inch. In certain embodiments, hinge 116 comprises a standard hinge known to one skilled in the art in certain embodiments, base member 134 comprises a rigid material selected from the group consisting of metal, plastic, wood, or combinations thereof. In certain embodiments, base member 134 comprises a rectangular member having a length between about 3 inches and about 4 inches, for example 3¾ inches. In certain embodiments, base member 134 comprises a width between about 1 inch and about 2 inches, for example 1¾ inches. In certain embodiments, base member 134 comprises a thickness between about ⅛ inches and about ¼ inches, for example ¼ inches.

Referring now to FIG. 2, magnetic mousetrap 100 is shown in motion comprising magnetic holder 110, trapping apparatus 120, and base 130. In the illustrated embodiment of FIG. 2, magnetic holder 110 comprises magnet 112, holding member 114, hinge 116, and bait 118. In the illustrated embodiment of FIG. 2, trapping apparatus 120 comprises spring bar 122, first hinge 124, trap bar 126, and second hinge 128. In the illustrated embodiment of FIG. 2, base 130 comprises attachment member 132, and base member 134. In the illustrated embodiment of FIG. 2, a person can place bait 118 in holding member 114. In the illustrated embodiment of FIG. 2, the person sets magnetic mousetrap 100 by attaching spring bar 122 over the top of trap bar 126 and attaching loose end 122a to attachment member 132. To contain and hold bait 118 within holding member 114, a person can place magnet 112 over bait 118 keep bait 118 within holding member 114. When a mouse moves bait 1187 the motion will trigger spring bar 122 to be released which will release trap bar 126 and the mouse will be trapped. Magnet 112 keeps a mouse from taking bait 118 away from the trap without triggering spring bar 122. When a person sets magnetic mousetrap 100, spring bar 122 is placed over trap bar 126. Second hinge 128 applies a tension to trap bar 126 when it is in a locked position. When magnetic holder 110 is moved by motion, spring bar 126 is release from under attachment member 132 and the tension of second hinge 128 is released and trap bar 126 snaps down to trap whatever object has caused movement of magnetic holder 110.

Referring now to FIG. 3, magnetic mousetrap 100 is shown having trapped a mouse comprising magnetic holder 110, trapping apparatus 120, and base 130. In the illustrated embodiment of FIG. 3, magnetic holder 110 comprises magnet 112, holding member 114, hinge 116, and bait 118. In the illustrated embodiment of FIG. 3, trapping apparatus 120 comprises spring bar 122, first hinge 124, trap bar 126, and second hinge 128. In the illustrated embodiment of FIG. 3, base 130 comprises attachment member 132, and base member 134. In the illustrated embodiment of FIG. 3, a person can place bait 118 in holding member 114. In the illustrated embodiment of FIG. 3, the person sets magnetic mousetrap 100 by attaching spring bar 122 over the top of trap bar 126 and attaching loose end 122a to attachment member 132. To contain and hold bait 118 within holding member 114, a person can place magnet 112 over bait 118 keep bait 118 within holding member 114. When a mouse moves bait 118, the motion will trigger spring bar 122 to be released which will release trap bar 126 and the mouse will be trapped. Magnet 112 keeps a mouse from taking bait 118 away from the trap without triggering spring bar 122. When a person sets magnetic mousetrap 100, spring bar 122 is placed over trap bar 126. Second hinge 128 applies a tension to trap bar 126 when it is in a locked position. When magnetic holder 110 is moved by motion, spring bar 126 is release from under attachment member 132 and the tension of second hinge 128 is released and trap bar 126 snaps down to trap whatever object has caused movement of magnetic holder 110.

Referring now to FIG. 4, a top view of magnetic mousetrap 100 is shown comprising magnetic holder 110, trapping apparatus 120, and base 130. In the illustrated embodiment of FIG. 4 magnetic holder 110 comprises magnet 112, holding member 114, hinge 116, and bait 118. In the illustrated embodiment of FIG. 4, trapping apparatus 120 comprises spring bar 122, first hinge 124, trap bar 126, and second hinge 128. In the illustrated embodiment of FIG. 4, base 130 comprises attachment member 132, and base member 134.

Referring now to FIG. 5, a side cross section view of magnetic holder 110 and base member 134 are shown comprising magnet 112, holding member 114, and bait 118.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A magnetic mousetrap, comprising:
   a magnetic holder comprising a metal holding member with a dimpled center having a first diameter and an associated magnet having a second diameter substantially the same size as said first diameter, said dimpled center receives a bait, wherein said bait is sandwiched between said metal holding member and said magnet, said bait is used to entice a mouse to come close to said magnetic mousetrap, said magnetic holder pivotably attached to a first hinge, said magnetic holder pivotally moves in a first direction around said first hinge and in a second and opposite direction around said first hinge,
   a spring bar comprising a first end and a second end, said first end of said spring bar releasably attached to said first hinge by an attachment member, said second end of said spring bar attached to a second hinge, said spring bar pivotably attached within said second hinge, said spring bar removeably hooked under said attachment member, said spring bar released from said attachment member when triggered by motion applied to said magnetic holder; and
   a trap bar held in a locked position by said spring bar, said trap bar comprising a third hinge, said third hinge applying tension to said trap bar when said trap bar is in said locked position, said trap bar released from said locked position when said spring bar is released from said locked position, said trap bar moves in an opposite direction to said tension in said trap bar, said trap bar snapping down on said mouse to trap said mouse.

* * * * *